Patented Sept. 3, 1940

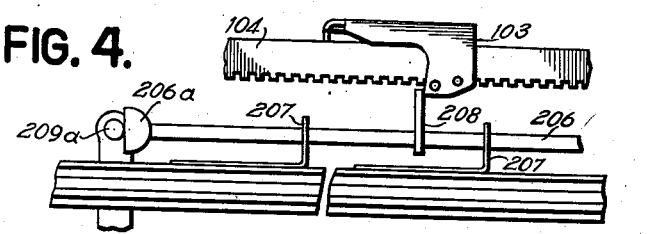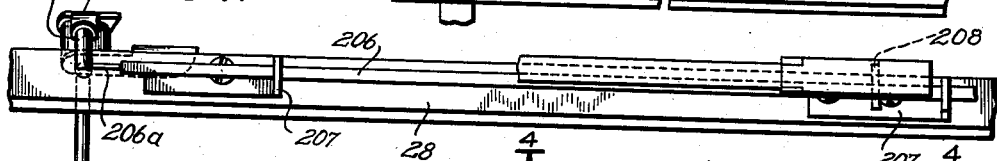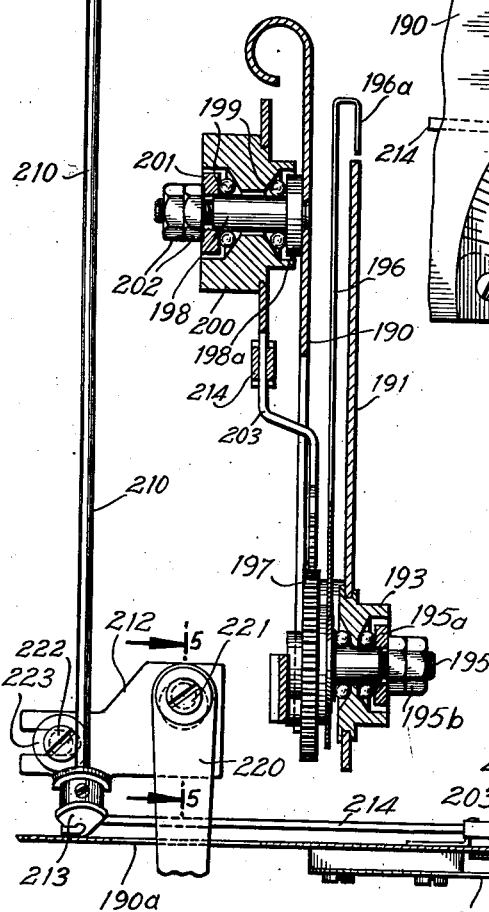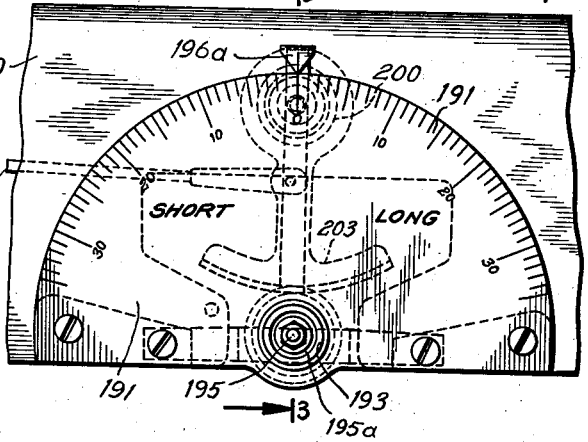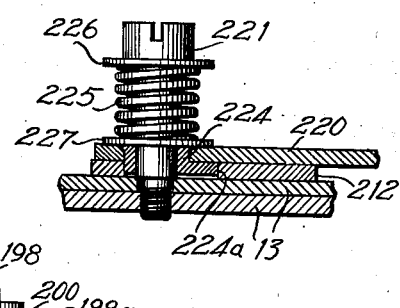

2,213,562

UNITED STATES PATENT OFFICE 2,213,562

TYPEWRITING MACHINE

Ronald D. Dodge, Rochester, N. Y., assignor to International Business Machines Corporation, New York, N. Y., a corporation of New York Application October 28, 1938, Serial No. 237,401

12 Claims. (Cl. 197—187)

This invention relates to typewriting machines.

An object of the present invention is to provide an indicating mechanism suitable for use in justifying typewriters.

An object is to provide a justification indicator for use in typewriting machines which space the characters according to their widths instead of a uniform amount for all characters.

An object is to provide a justification indicator which is actuated by the carriage and is designed to magnify small increments of movement of the carriage whereby relatively small increments of spacing may be easily noted by the operator.

An object is to provide a justification indicator with means for setting the indicator in exact correspondence with the position of the carriage.

An object is to provide a justification indicator which is operated by the movement of the carriage but nevertheless does not impose any appreciable additional load upon the carriage feeding means.

An object is to provide a justification indicator having a moving pointer so designed as to eliminate the effect of parallax whereby an accurate reading may be had irrespective of the operator's position in viewing the indicator.

Further objects of the instant invention reside in any novel feature of construction or operation or novel combination of parts present in the embodiment of the invention described and shown in the accompanying drawing whether within or without the scope of the appended claims and irrespective of other specific statements as to the scope of the invention contained herein.

In the drawing:

Fig. 1 is a plan view of the justification indicator and its operating mechanism.

Fig. 2 is a front view of the indicator.

Fig. 3 is a vertical section on the line 3—3 of Fig. 2.

Fig. 4 is a fragmentary view in front elevation of the marginal stop and part of the means actuated thereby for operating the indicator.

Fig. 5 is a vertical section on the line 5—5 in Fig. 1.

The present application relates to an indicator suitable for use in a machine like the one disclosed in application Serial No. 148,270 filed June 15, 1937 by R. D. Dodge. In that machine there is provided variable spacing mechanism which is selectively controlled by the keys to cause the characters printed on the work sheet to be spaced amounts more or less proportional to their widths whereby to simulate as closely as possible printed matter composed with printers' type. The increments of spacing in this machine are relatively small in comparison with the increments of spacing effected by conventional typewriting machines producing uniform spacing of the characters such as the standards of $\frac{1}{10}$ of an inch for pica and $\frac{1}{12}$ of an inch for elite machines. The machine disclosed in the above application is provided with a justification indicator which enables the operator to measure the extent of shortage or over-typing of a line with respect to an arbitrary marginal position in order that a draft copy may subsequently be retyped with a justified right-hand margin.

In the Dodge machine, the carriage is returned by power means controlled by the left-hand marginal stop to automatically arrest the carriage at the proper left-hand marginal position. In the interests of mechanical strength it is desirable that the marginal stop be very securely locked in position upon the marginal stop rack to prevent slippage of the stop due to the shock of arresting of the carriage. For this reason a toothed marginal stop rack is preferred and the marginal stop is provided with means to lock it in position by engagement with the toothed portion of the rack. It is not practical to provide a tooth for every unit of spacing in the Dodge machine because the unit of spacing is very small, being of the order of .022" and teeth of such small size will not have sufficient mechanical strength or be deep enough to resist the tendency of the marginal stop to slide along the rack. It is also desirable that the marginal stops be settable to definite positions in order that uniformity of line length and margin may be obtained. In other words it is desirable that it be possible to set the marginal stops to the same values in the event that it is necessary to rewrite pages for correction and still have the lengths of the lines exactly the same.

In the indicator disclosed in the Dodge application there is provided a pointer and a dial plate having a zero position and a scale of numbers on each side of the zero position to indicate the amount of shortage or excess typing of a line relative to the desired marginal position which should correspond to the zero point on the scale. In the machine disclosed in the Dodge application the marginal positions are determined by the marginal stop rack which may have teeth spaced $\frac{1}{6}$ of an inch apart.

It is very difficult in manufacturing the marginal stop rack, the escapement rack, the pinion meshing with the escapement rack and the parts of the escapement to secure absolute accuracy, therefore, it is possible for inequalities in the spacing of the teeth in these parts to produce an accumulative error at certain points in the movement of the carriage whereby the pointer of the indicator disclosed in the Dodge application may not always register exactly with a graduation on the dial. It is desirable, therefore, that means be provided to set the dial to compensate for such slight inaccuracies in parts which are unavoidable with quantity production of the parts.

Secured to the front cover plate 190, Figs. 1, 2, and 3, is a semi-circular dial plate 191 which is spaced from the cover plate by means of blocks 192. The dial plate 191 (Fig. 2) has its outer edge graduated at intervals equivalent to one unit of spacing, i. e., the theoretical unit of feed of the carriage. In the machine disclosed in the Dodge application the unit of feed of the carriage is .022″ although the smallest feed which it is possible to obtain with that machine is two units or .044″.

It has been found by experience to be more practical to use a marginal stop rack having nine teeth per inch and a unit of spacing of .02222″, which for practical purposes may be considered as 1/45 of an inch, the error being so negligible as to be unimportant. On this basis each tooth space on the marginal stop rack corresponds to five units of spacing of the carriage. The dial 191 has an arbitrary zero mark which should correspond to the desired right-hand marginal position of the carriage. Secured in a hole in the dial plate 191 (Fig. 3) is a ball race 193 in which is rotatably mounted, on two rows of balls 194, a stub shaft 195. A washer 195a and lock nuts 195b on a threaded portion of stub shaft 195 hold the stub shaft and balls 194 in their proper relation to the ball race 193.

Integral with the stub shaft 195 is a pointer 196 (Figs. 1, 2, and 3) and a gear 197. The pointer 196 is located behind the dial plate 191 in the space between the dial plate and the front cover plate 190. When the carriage is in the right-hand marginal position, pointer 196 extends directly upwardly to a point above the upper edge of the dial plate and at this point is bent U-shaped so as to have a downwardly projecting portion 196a in the plane of the dial plate, but not quite touching the curved edge thereof. In this position of the carriage, the pointer should coincide with the zero mark on the dial plate. By constructing the dial plate and pointer in this fashion the effect of parallax is avoided.

Secured on the rear face of the front plate 190 (Figs. 2 and 3) is a stud 198 on which is rotatably mounted, by means of two rows of balls 199, a hub 200 internally constructed somewhat similarly to the ball race 193. The stud 198 has a shoulder 198a which retains the right-hand row of balls 199, while a washer 201 on the other end of stud 198 retains the left-hand row of balls 199. Two lock nuts 202, on a threaded portion of the stud 198, in cooperation with the washer 201, prevents the hub 200 from slipping off the end of stud 198. Secured to the hub 200 is a gear sector 203 (Figs. 1 to 3) meshing with the gear 197.

The gear sector 203 is operated by the carriage through a portion of its letter spacing movement by means of a train of connections to the right-hand marginal stop which is designated 103 in Figs. 1 and 4. The marginal stop 103 is adjustably slidably mounted on the toothed marginal stop rack 104 which is secured to the carriage end plates in a well known way.

A square rod 206 (Figs. 1 and 4) is slidably mounted in brackets 207 secured to the rear rail 28. Rigidly mounted on the right-hand end of the rod 206 is a plate 208 projecting upwardly into the path of the marginal stop 103. The left-hand end of the rod 206 is flattened at 206a to provide a relatively long, but thin, bearing edge shaped like a chisel engaging a pin 209a on an arm 209 secured to a shaft 210. This shaft is journaled in brackets 211, 212 secured to the under-side of the rear rail 28 and mounted on the frame 13, respectively. Secured to the forward end of the shaft 210 is an arm 213 connected by a link 214 to the gear sector 203.

With reference to Figs. 1 and 4, it is evident that, during the movement of the carriage to the left to type a line, the marginal stop 103 will eventually strike plate 208 as shown in Fig. 4 and move rod 206 to the left with the carriage. Through the train of connections including rod 206, arm 209, shaft 210, arm 213, and link 214, the gear sector 203 will be rocked counterclockwise (Fig. 2) thereby rotating the indicator pointer 196 clockwise in that figure. The pointer starts to turn when the carriage is approximately thirty-five units short of the right-hand marginal position, that is, within .77″ of the marginal position. This is, of course, arbitrary as the magnitude of the unit of spacing, the point of becoming operative of the indicator, and the number of scale divisions may be changed as desired.

The sector 203 and gear 197 act as a movement multiplying mechanism enabling the amount of small movements of the carriage such as are not perceptible to the eye of the operator to be readily observed by means of the movement of the pointer 196.

The graduations on the dial plate 191 represent units of spacing of .02222″ whereas the teeth on the marginal stop rack 104 are spaced 1/9 of an inch apart. Obviously, if the marginal stop 103 were shifted one tooth space to the right in Fig. 4 the pointer 196 will be caused to rotate five graduations from zero in a clockwise direction (Fig. 2) and will stop in a position in registry with the fifth graduation.

Theoretically, with a marginal stop rack having nine teeth to the inch and a unit of spacing of the value of .02222″, movement of the marginal stop to any given position on the rack 104 should cause the pointer 196 to register exactly with any fifth graduation on the dial 191 such as 5, 10, 15, etc. However, accumulative errors in the spacing of the teeth of the various toothed parts, or even in the parts cooperating with the teeth of the escapement wheels, may cause errors in indication of half the distance between graduations on the dial 191 or even more. Due to this error it may not be possible to set the marginal stop 103 in a position to cause pointer 196 to register exactly with zero but instead the pointer may be to one side or the other of the zero mark.

The means for bringing the pointer into exact registry with the zero mark on the scale when the carriage is in any desired marginal position and the pointer has been brought approximately, if not exactly, into coincidence with the zero mark by moving the marginal stop until the pointer is nearest to zero, consists of a lever 220 pivotally mounted on the frame 13 (Figs. 4 and 5) by means of a screw stud 221. The bracket 212 on which the shaft 210 is journaled at the front part of the machine is partly slidably mounted on the frame 13 by means of a stud 222 and a washer 223. The lever 220 projects through a slot 190a in the front cover plate of the machine so as to be accessible to the operator and has riveted thereto a bushing 224 having an eccentric portion 224a fitting a hole in the bracket. A spring 225, interposed between a washer 226 abutting the head of a screw 221 and a washer 227 abutting the arm 220 presses said arm downwardly on the top surface of the bracket and thereby presses the bracket into engagement with the top surface of the frame 13 whereby the lever 220 will be held in any of its set positions by friction.

A specific example may be used to illustrate how the lever 220 is employed to make the pointer 196 register with zero or with a given graduation. Let it be assumed that it is desired to type a line 135 units in length which corresponds to three inches. The left-hand marginal stop is set in the desired position, then the carriage is moved to a position which, by reference to the usual scale provided for the purpose, corresponds to 135 units of spacing. With the carriage in this position and with the lever 220 in the central position, as in Fig. 1, the right-hand marginal stop 103 is moved to the left until it engages the plate 208 and moves the pointer 196 to a position as close to zero as possible. It may happen that when the pointer 196 registers exactly with zero that the marginal stop 103 will lock in a tooth space in the rack 104 so that when the marginal stop is released the pointer 196 will remain exactly at zero. It is quite possible, however, that there may be an accumulative error in the parts which may cause the pointer to take a position on either side of zero when the marginal stop is properly seated in a tooth space in the rack 104. In this event, it is merely necessary to move the lever 220 to right or left in Fig. 1 slowly until the pointer 196 is observed to register with zero.

Movement of the pointer independently of the marginal stop 103 is effected by the movement of the bracket. Movement of the bracket to the left in Fig. 1 tends to rotate the sector clockwise by drawing the link 214 to the left and thereby rotates the pointer counterclockwise. This movement is effected notwithstanding the fact that the arm may be engaging the marginal stop 103. Similarly, movement of the lever 220 to the right in Fig. 1 will cause the pointer 191 to rotate in a clockwise direction. The mechanism is so designed that the pointer 196 may be moved by lever 220 about one unit.

While there has been shown and described and pointed out the fundamental novel features of the invention as applied to a single embodiment it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In combination with a carriage having a marginal stop rack and a marginal stop adjustable uniform extents along the rack, a justification indicator, means engageable by the marginal stop for operating the justification indicator, and a manual device for adjusting the indicator so that one of its readings coincides with the position of the marginal stop when the marginal stop is in the margin defining position.

2. In combination with the carriage of a typewriting machine, a marginal stop rack and a marginal stop adjustable uniform extents along the rack to define marginal positions of the carriage, a justification indicator, means engageable by the marginal stop for operating the justification indicator, and means for setting the indicator to a predetermined reading when the carriage is in the position defined by the marginal stop.

3. In combination with the carriage of a typewriting machine, a marginal stop rack and a marginal stop adjustable to any one of a plurality of uniformly spaced positions along said rack to define a marginal position of the carriage; a justification indicator comprising a dial and a pointer, said dial having a zero mark corresponding to the marginal position and two scales, one on each side of the zero mark and denoting line shortage and over-typing of a line, respectively; said scale being graduated in units of spacing of magnitude different from the distance between two successive positions of the marginal stop on said rack; means connected to the pointer and engageable with the marginal stop a predetermined distance before the carriage reaches the position defined by the marginal stop for operating the pointer, and means to move the pointer independently of the operation thereby of the marginal stop to adjust the pointer to register with zero on the dial when the carriage is in the margin defining position.

4. In combination with a carriage, a marginal stop rack and a marginal stop adapted to be locked to the marginal stop rack in any one of a plurality of successive marginal positions which are evenly spaced on the marginal stop rack, a justification indicator having a zero point corresponding to the marginal position of the carriage defined by the setting of the stop, and scales on either side of the zero point to indicate the distance the carriage is short of or beyond the marginal position as the case may be, said scales being marked in units of spacing differing from the distance between two successive positions of the marginal stop on said rack whereby the movement of the carriage as it approaches and passes the margin defining position is measured in units of spacing different from the units of spacing of the carriage as defined by the possible successive positions of the marginal stop; a train of connections to said indicator for operating the latter in response to the movement of a carriage and including a member engaged by the marginal stop as the carriage approaches the margin defining position, and means in said train of connections for positioning the indicator to read zero when the carriage is in the marginal position.

5. In combination with the carriage of a typewriting machine, a toothed marginal stop rack and a marginal stop provided with means to interlock with the teeth to hold the marginal stop in any one of a plurality of adjusted positions to define a marginal position of the carriage, said marginal stop rack having evenly spaced teeth; a justification indicator comprising a dial and a pointer cooperating with the dial, said dial having a zero mark corresponding to an arbitrary marginal position defined by the setting of the marginal stop on said rack, said dial being graduated in units of spacing differing from the spacing of the teeth in the marginal stop rack; operating means for said indicator including an element engageable by the marginal stop whereby the movement of the carriage adjacent the marginal position is measured by said indicator, and means for changing the relation of the pointer and dial when the carriage is in the marginal position whereby to compensate for the inequalities between spacing of the teeth on said rack and the graduation of the dial.

6. In combination with the carriage of a typewriting machine, a marginal stop rack and a marginal stop adjustable fixed extents along said rack to define a marginal position of the carriage, a justification indicator comprising a dial, a pointer cooperating with the dial, a movement multiplying mechanism for moving the pointer and dial relative to each other whereby a relatively small operating movement applied to a part of the movement multiplying mechanism causes a large movement of the dial and pointer relative to each other, means engaged by the marginal stop for actuating the movement multiplying mechanism whereby relatively small movements of the carriage such as may not be readily perceptible to the human eye are made readily observable to the indicator, and means for moving the movement multiplying mechanism independently of the means engaged by the marginal stop for causing the indicator to have a predetermined reading when the carriage is in the marginal position.

7. In combination with the carriage of a typewriting machine, a marginal stop adjustable in the line of travel of the carriage to define an arbitrary marginal position of the carriage, a dial having a mark thereon denoting the marginal position defined by the marginal stop and a scale of values for indicating the extent of movement of the carriage with reference to the marginal position, a pointer cooperating with the dial, a gear connected to the pointer, a larger gear meshing with the first gear, an actuating linkage connected to the larger gear and including a member slidably mounted for movement with the carriage, and means on said member and engaged by the marginal stop for operating the linkage.

8. In combination with the carriage of a typewriting machine, a marginal stop adjustable in the line of travel of the carriage to define an arbitrary marginal position of the carriage, a dial having a mark thereon denoting the marginal position defined by the marginal stop and a scale of values for indicating the extent of movement of the carriage with reference to the marginal position, a pointer cooperating with the dial, a gear connected to the pointer, a larger gear meshing with the first gear, an actuating linkage connected to the larger gear and including a member slidably mounted for movement with the carriage, means on said member and engaged by the marginal stop for operating the linkage, and manual means connected to one of the parts of the linkage for adjusting the pointer to register with said mark when the carriage is in the marginal position.

9. In combination with the carriage of a typewriting machine, a marginal stop rack, a marginal stop adjustably mounted thereon adjustable to any one of a plurality of positions to define a marginal position of the carriage, a justification indicator including a dial having a mark thereon denoting a marginal position, a pointer cooperating with the dial, means engageable with the marginal stop for operating the pointer and including a lever and a link and manual means for shifting the pivot center of said lever to bring the pointer into registry with the margin denoting mark when the carriage is in the marginal position.

10. In combination with the carriage of a typewriting machine, a marginal stop rack and a marginal stop adjustable fixed extents along said rack to define a marginal position of the carriage, a justification indicator having a scale graduated in units of spacing having a value different from the distance between any two successive positions of the marginal stop on said rack, means operated by the marginal stop for actuating the indicator to measure the extent of carriage movement in the vicinity of the marginal position defined by the marginal stop, and means to adjust the indicator to read zero when the carriage is in the marginal position.

11. In combination with the carriage of a typewriting machine, a marginal stop adjustable in the line of travel of the carriage to define an arbitrary marginal position of the carriage, a dial having a mark thereon denoting the marginal position defined by the marginal stop and a scale of values for indicating the extent of movement of the carriage with reference to the marginal position, a pointer cooperating with the dial, a gear connected to the pointer, a larger gear meshing with the first gear, an actuating linkage connected to the larger gear and including a member slidably mounted for movement with the carriage and means on said member and engaged by the marginal stop for operating the linkage, and a manual means for variably displacing a part of said linkage to move the pointer into registry with the mark denoting the marginal position when the carriage is in said position.

12. In combination with the carriage, having a marginal stop adjustable fixed extents to determine a marginal position of the carriage, an indicator having a scale provided with a mark denoting the marginal position and a pointer movable past said mark, means engaged by the marginal stop for actuating the indicator including a shaft, a movable bearing for the shaft, and manual means for moving said bearing for the shaft to bring the pointer into registry with the mark denoting the marginal position when the carriage is in the position defined by the marginal stop.

RONALD D. DODGE